United States Patent [19]

Zahuranec et al.

[11] Patent Number: 4,678,380

[45] Date of Patent: Jul. 7, 1987

[54] DEBURRING TOOL

[75] Inventors: Emery J. Zahuranec, Novelty; James C. Musil, Sagamore Hills, both of Ohio

[73] Assignee: Crawford Fitting Co., Solon, Ohio

[21] Appl. No.: 819,722

[22] Filed: Jan. 17, 1986

[51] Int. Cl.$^4$ .................. B23B 5/16; B23D 79/08
[52] U.S. Cl. .................. 408/211; 407/33; 407/57; 408/227
[58] Field of Search .............. 407/33, 56, 57; 408/211, 227, 228; 29/1.32; 76/101 A; 82/4 C

[56] References Cited

U.S. PATENT DOCUMENTS

| 651,377 | 6/1900 | McDermott | 408/228 |
|---|---|---|---|
| 1,228,951 | 6/1917 | Morton | 408/227 |
| 1,737,580 | 2/1929 | Fleming | 408/231 |
| 2,242,821 | 5/1941 | Fanslow | 408/229 |
| 2,309,410 | 1/1943 | Miller | 407/33 |
| 3,137,208 | 6/1964 | Andler | 408/211 |
| 3,232,145 | 2/1966 | Wilson | 408/202 |
| 3,550,482 | 12/1970 | Lee | 408/228 |
| 3,754,832 | 3/1975 | Stickler | 408/227 |
| 3,870,432 | 3/1975 | Strybel | 408/191 |
| 4,229,129 | 10/1980 | Schaenzer | 408/228 |

Primary Examiner—Gil Weidenfeld
Assistant Examiner—Steven C. Bishop
Attorney, Agent, or Firm—Fay, Sharpe, Beall, Fagan, Minnich & McKee

[57] ABSTRACT

A deburring tool for reaming inner and outer diameter end portions of tube and pipe-like workpieces includes a cast housing having an integrally formed conical support member therein. The conical support member has a base portion disposed adjacent one end of the housing and an apex area spaced toward the other end of the housing. Radially disposed apertures having a predetermined width dimension divide the conical support member into a plurality of wedge portions. A blade assembly is comprised of a plurality of separate blades which are fixedly secured to each other in a pattern identical to the pattern of apertures in the support member. The blades have a thickness dimension which is greater than the width dimension of the apertures in order that the blade assembly will be retained in the conical support member by a press-fit relationship established between the blades and apertures. Each blade includes first and second cutting surfaces protruding axially from the support member and adapted for deburring engagement with the inner and/or outer diameter end portions of an associated workpiece.

14 Claims, 5 Drawing Figures

DEBURRING TOOL

BACKGROUND OF THE INVENTION

This invention pertains to the art of deburring tools, and, more particularly, to a manual deburring tool. The invention is particularly applicable to use in reaming inner and outer diameter end portions of tube and pipe-like workpieces, and will be described with particular reference thereto. However, it will be appreciated that the invention has broader applications and may advantageously be adopted to use in other environments.

The cut end of a pipe or tube normally includes roughened edge areas or burrs due to the shearing or cutting action imposed by conventional cutting tools. These roughened edges, in turn, prevent a close interengaging fit between mating pipe ends. In the fluid environment, burrs and roughened edges have an adverse effect on fluid flow causing cavitation problems. Removal of the burrs thereby promotes laminar flow. Additionally, roughened edges prohibit insertion into a fitting or body having a precise dimension adapted to receive the pipe end. Moreover, if wires or the like are to be drawn through the pipe, the roughened edges may snag or otherwise damage the wires. Therefore, it is oftentimes desirable and, indeed, necessary to remove the roughened edges or burrs on cut ends of pipe or tubing.

Prior art manual type tools directed to use for deburring both inner and outer diameter end portions of cut pipe or tubing are represented by U.S. Pat. No. 2,242,821 to Fanslow and U.S. Pat. No. 3,232,145 to Wilson. In U.S. Pat. No. 2,242,821, an outer metallic body is cast about reamer blades and permitted to solidify. Casting of the blades directly into the body forms an anchoring means for base ends of the blades. Special provision is made in each blade to assure correct placement, and apertures left in portions of the mold support the blades during casting.

An alternative tool construction is illustrated in U.S. Pat. No. 3,232,145 in which a body portion is internally threaded at one end and has a shoulder spaced therein for receiving the forward end of a blade assembly. A retaining ring is threadedly received by the internal body threads and abuts the rear end of the blade assembly. This construction requires detailed machining of the body in order to accurately and securely receive the retaining ring. Such manufacturing operations are expensive and outweigh the economic benefits derived from the tool design.

It has, therefore, been considered desirable to develop a manually operated deburring tool for both internal and external use. Such tool should be economical to manufacture, have means to securely retain the blades in the assembly, be of a sturdy overall construction, and have a blade arrangement which performs an effective deburring operation. The subject invention is deemed to meet the foregoing needs and others.

SUMMARY OF THE INVENTION

In accordance with the subject invention, a tool is provided for deburring end portions of a workpiece. The tool includes a generally cylindrical housing having blade support means disposed therein. The support means has plural radially extending apertures that have a predetermined width dimension. A blade assembly adapted for mounting in the support means includes plural individual blades each having first and second cutting faces. When the blade assembly is mounted in the body, the blade cutting faces are spaced axially outward of the support means. Each blade has a predetermined cutting face width dimension greater than the width dimension of the associated aperture. This dimensional relationship permits the blades to be securely press fit into mounting engagement with the support means.

In accordance with a more limited aspect of the invention, the cylindrical housing includes means for gripping disposed along the exterior surface thereof.

In accordance with another feature of the invention, the housing and support means are formed of a cast zinc or the like material.

In accordance with another aspect of the invention, the individual blades are fastened together to form the blade assembly.

A principal advantage of the present invention is the provision of a manual deburring tool which is simple in design to facilitate economical manufacture.

Another advantage of the invention resides in an arrangement which readily allows the blade assembly to be securely mounted with respect to the housing.

Yet another advantage of the invention is found in a sturdy overall tool construction which is adapted to use in a wide range of internal and external deburring applications.

A further advantage of the invention is in the provision of effective cutting edges on the blades.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
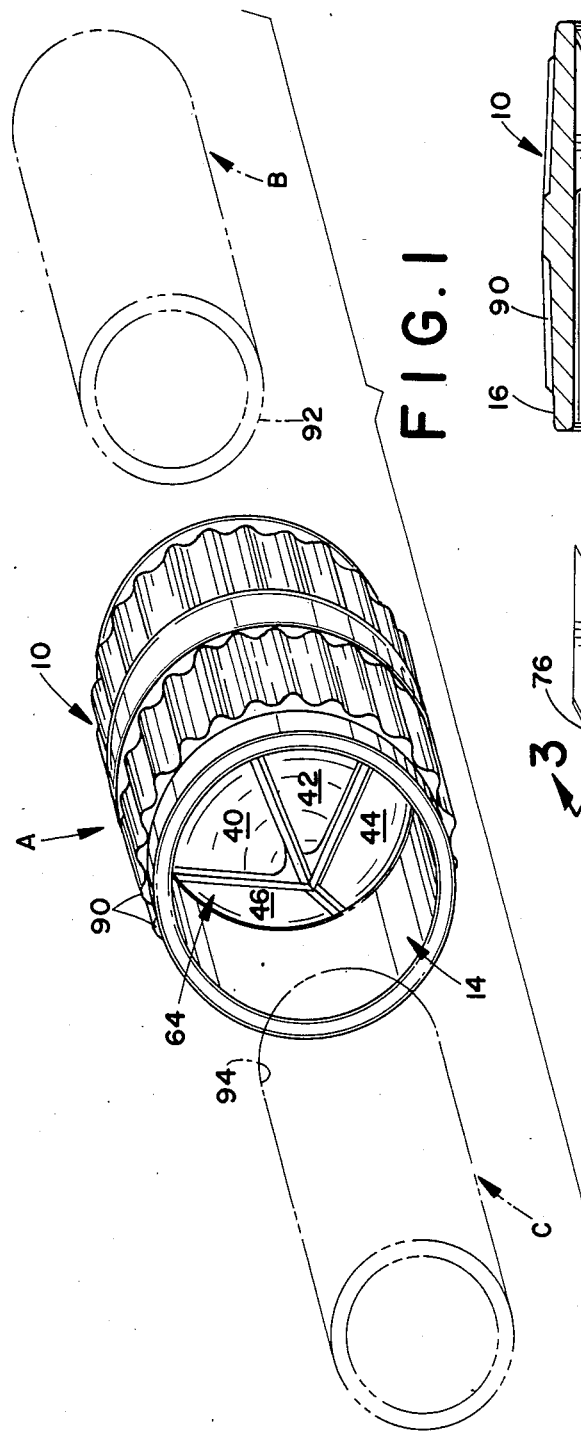
FIG. 1 is a perspective view of the subject deburring tool.

Referring now to the drawings wherein the showings are for purposes of illustrating the preferred embodiment of the invention only and not for purposes of limiting same, FIG. 1 shows a new deburring tool A which is adapted for deburring an outer diameter edge portion of a tube or pipe-like workpiece B, shown in phantom, and an inner diameter edge portion of a tube or pipe-like workpiece C. Workpieces B, C are shown in phantom for convenience, and, as will become more apparent hereinbelow, may comprise the same workpiece or, alternatively, a pair of distinct workpieces. The deburring tool is generally of a size to accommodate manual gripping, i.e., approximately two inches in diameter, so that the end diameters of the workpiece must be at least slightly smaller to allow deburring. These dimensions are merely illustrative, and various tool sizes are possible and contemplated without departing from the intent or scope of the invention.

Figure 2:
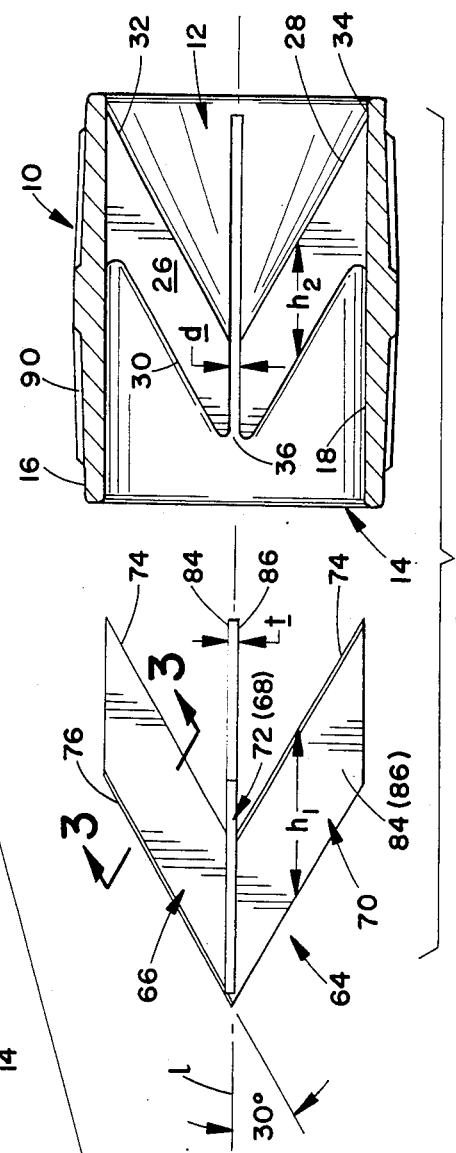
FIG. 2 is a longitudinal cross-sectional view of FIG. 1 with the blade assembly shown removed from the housing for ease of illustration.

With additional reference to FIG. 2, the deburring tool A includes a body or housing 10. The housing is of generally cylindrical conformation having a longitudinal axis 1 extending between first and second open ends 12, 14, respectively. The housing is a thin-walled structure having an outer diameter defined by an exterior wall or surface 16 and an inner diameter defined by an interior wall or surface 18. The housing first and second open ends are perpendicular to the longitudinal axis, and the surfaces 16, 18 are concentrically disposed with respect to the longitudinal axis.

A conical support member generally designated 26 extends radially inward from housing inner surface 18 and includes a first surface 28 generally facing housing first open end 12. A second surface 30 is axially spaced from the first surface toward and in facing relation to housing second open end 14. The first surface 28 has a base portion 32 integral with the housing inner surface and disposed inwardly adjacent the first open end 12 so as to form a circumferential lip portion 34. The support member first surface 28 tapers radially inward toward axis 1 in a direction away from the first open end toward second open end 14. Second surface 30 is generally parallel to the first surface 28 over its full radial extent and forms a nose portion or apex 36 at the longitudinal axis 1.

Figure 4:
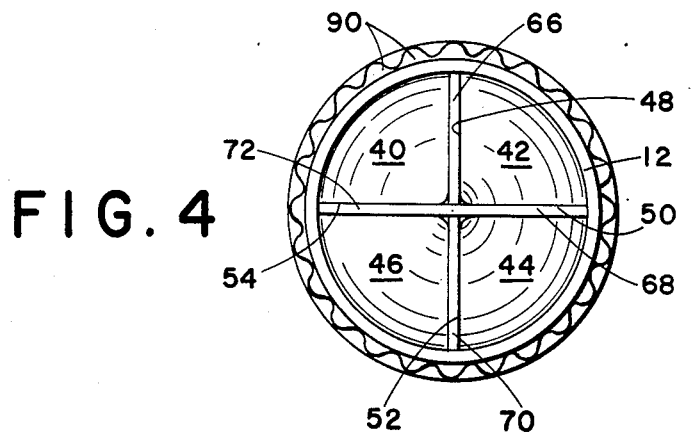
FIG. 4 is an end view of the tool taken from the right-hand side of FIG. 2; and, FIG. 5 is an exploded, generally perspective view of the blade assembly of the subject invention.

The conical support member 26 is formed of a plurality of equal-sized, wedge-shaped members 40, 42, 44, 46 (FIG. 4). The wedge portions are separated by plural radial slots or apertures 48, 50, 52, 54 which extend radially from the longitudinal axis to the housing inner surface 18 and communicate axially between first and second surfaces 28, 30. Each aperture has a first predetermined width dimension d (FIG. 2) as measured perpendicular to the radial length dimension. In accordance with the preferred embodiment shown, apertures 48, 50, 52, 54 are spaced apart from each other by 90° intervals, although it would also be possible to use different intervals, or a greater or lesser number of apertures without departing from the overall intent or scope of the invention.

Figure 5:
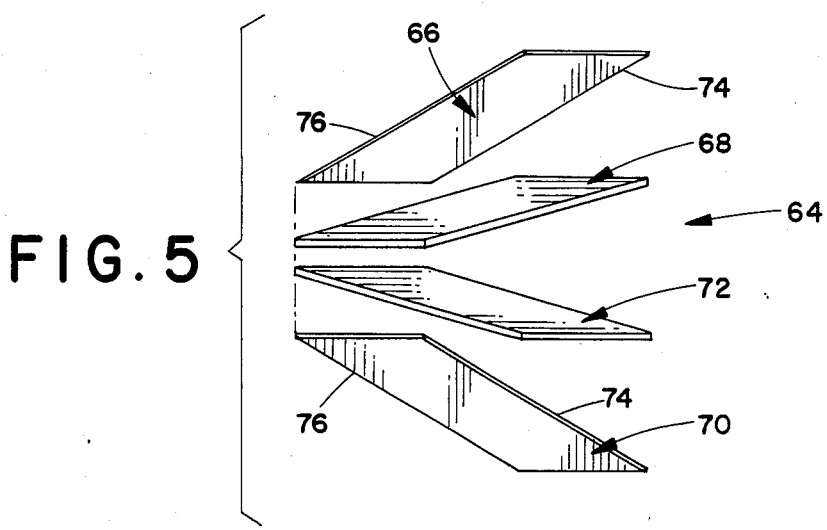

As particularly shown in FIGS. 2, 4, and 5, a blade assembly 64 is provided which is comprised of four separate blade members 66, 68, 70, 72. The periphery of each blade generally defines a parallelogram. An end edge or surface of each blade is positioned in abutting relation with the end edge or surfaces of the remaining blades, and the blades are then fastened together in that position by convenient, known means. The blades thereby form an integral blade assembly. The positioning and fastening of the blades is such that the number and spacing of the blades correspond with the number and spacing of the apertures in support member 26. The reason for such arrangement will become apparent from discussion appearing hereinafter.

Figure 3:
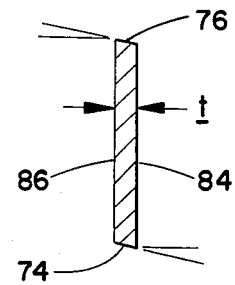
FIG. 3 is a cross-sectional view taken along the lines 3—3 of FIG. 2 for particularly illustrating an individual blade.

As more particularly illustrated in FIG. 3, each blade includes first and second bevelled cutting surfaces 74, 76. The cutting surfaces are angularly disposed to provide a cutting type action with an associated workpiece, rather than a simplified, less effective rubbing type of action. A first distance h is defined between the cutting surfaces 74, 76 in a direction parallel to longitudinal axis 1. Distance h is substantially greater than a second distance h defined between the support member first and second surfaces 28, 30, also as measured parallel to the longitudinal axis. This dimensional relationship assures that the cutting surfaces 74, 76 are spaced outwardly from the support member surfaces 28, 30 when the blade assembly is placed in the mounted position in body 10. The outward spacing of the cutting surfaces 76 is particularly illustrated in FIG. 1 for deburring the inner diameter end portion of workpiece C. Similarly, and as will be understood by those of ordinary skill in the art, the cutting surfaces 74 are generally parallel to cutting surfaces 76 on each blade and, likewise, extend outwardly from support member surface 28.

With reference to FIGS. 2-4, each blade has a thickness t between opposed blade faces 84, 86. The faces of each blade, in turn, abut contiguous wedge portions of support member 26 when the blade assembly is mounted in the support member apertures 48, 50, 52, 54. The dimension t is substantially greater than width dimension d of the apertures so that wedge portions 40, 42, 44, 46 are deformed from their normal, free state relationship shown in FIG. 2 as the blade assembly is axially inserted into the support member 26. The individual wedge portions are sufficiently resilient so as to exert opposed forces on faces 84, 86 of each blade, thereby tightly grasping the blade assembly in a retained position in support member 26.

Once the blade assembly is positioned in the support member, the cutting surfaces 74, 76 of each blade are spaced outwardly from the respective support member surfaces 28, 30. The axial extent of lip portion 34 closely approximates the preferred outward spacing of the cutting surface 74 from the support member first surface 28. At assembly, the blade assembly 64 is inserted into the body or housing 10 at the first open end 12 thereof so that wedge portions 40, 42, 44, 46 are deformed radially outward. Because of the difference between dimension d and t, a predetermined force must be imposed on the blade assembly to overcome the natural tendency of the wedge portions to resist deformation. The blade assembly is inserted sufficiently into the housing and support member so that no portion of cutting surfaces 74 extend axially outward beyond the housing first open end 12. In this position, and because of the above described relative dimensioning between components, the cutting surfaces 74 extend outwardly from support member surface 28 and cutting surfaces 76 extend outwardly from support member surface 30.

The housing 10 is provided with a plurality of circumferentially spaced, axially extending raised portions 90 along the exterior thereof. The raised portions facilitate ease of gripping for manual rotation of the tool in deburring contact with a workpiece. More particularly, and with reference to FIG. 1, pipe or tube-like workpiece B is deburred along an outer diameter end portion 92 through working engagement with cutting surfaces 74 of the blade assembly. The housing extends around and receives a portion of workpiece B therein. Similarly, workpiece C is received within the second open end 14 of the housing for allowing an inner diameter portion 94 to be engaged by the cutting surfaces 76. Relative rotation between the housing and the pipe about axis 1 deburs the rough edges. A smooth, bevelled edge is produced on the workpiece end by the deburring tool acting on either the outer or inner diameter portions 92, 94, or both.

In the preferred embodiment, the housing and support member are integrally formed by casting. Preferably, they are die cast of a zinc material to provide sufficient "heft" to the housing. This material is also sufficiently resilient to accommodate the press-fit engagement between the support member and blade assembly.

The individual blades of the blade assembly are formed of tool steel with sufficient hardness for use with a wide variety of workpiece materials. If necessary, the blades may be constructed of different hardness to accommodate specific materials encountered in the field. Typically, the cutting surfaces are positioned approximately 30° to the longitudinal axis 1 of the housing (FIG. 2). Greater or lesser angular positions may be used with equal success without departing from the intent and scope of this invention. Additionally, the cutting surfaces 74, 76 form a relief angle (FIG. 3) to assure a cutting action rather than a rubbing one with the workpiece.

The blade assembly 64 is preferably formed by fastening the four individual blades together to provide a unitary structure. It is important that no fillets result along the junctures between the blades. The absence of fillets thereby permits a close press-fit relationship between the blade assembly and the support member.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, what is claimed is:

1. A hand tool for deburring peripheral end portions of a generally cylindrical workpiece, said tool comprising:
    a generally cylindrical housing having a longitudinal axis extending axially thereof, said housing having first and second open ends;
    a generally conical blade support means disposed in said housing so as to have a base area adjacent said housing first end and an apex area spaced toward said housing second end at said longitudinal axis, said support means including plural apertures extending radially outward from said apex area in a first predetermined pattern and each having a predetermined unstressed width dimension;
    a blade assembly mountingly supported by said support means, said blade assembly including a plurality of individual blades fixedly connected together so as to define a second predetermined pattern identical to said first pattern and received therein, each of said blades having first and second cutting surfaces spaced axially outward from inner and outer surfaces of said support means, each blade further having a predetermined thickness dimension which is substantially greater than said unstressed aperture width dimension whereby said blade assembly is retained in a desired supported position relative to said support means by a presss fit relationship generated between each of said blades and respective apertures.

2. The deburring tool as defined in claim 1 wherein said cylindrical housing includes means for gripping an exterior surface of the housing.

3. The deburring tool as defined in claim 1 wherein said individual blades are fastened together.

4. The deburring tool as defined in claim 1 wherein said cylindrical housing and support means are formed by casting.

5. The deburring tool as defined in claim 1 wherein said first and second cutting surfaces of each blade are bevelled for positive cutting action.

6. A deburring tool particularly for use in deburring inner and outer end portions of a generally tubular workpiece, said tool comprising:
    a generally thin-walled cylindrical housing having a longitudinal axis extending between spaced apart first and second open ends;
    a generally conical blade support integral with said housing at a housing interior surface, said blade support extending radially inward from said interior surface and terminating in an apex area at said longitudinal axis, said conical blade support including first and second opposed surfaces generally facing said housing first and second open ends, respectively;
    said blade support having a plurality of apertures extending radially thereof and communicating between said first and second surfaces for defining a plurality of wedge portions, said apertures being generally equiangularly spaced apart from each other and each having an unstressed first predetermined width dimension;
    a blade assembly comprised of a plurality of blades equal in number to said plurality of apertures, each blade being fixedly secured to the other blades at an apex zone in a generally equiangular spaced relationship to extend angularly away from said apex zone at substantially the same angle as said blade support extends from said apex area;
    each of said blades having a second thickness dimension which is substantially greater than the unstressed first predetermined width dimension of each of said apertures, the individual blades of said blade assembly each being received in a press fit relationship by an associated aperture in said blade support such that said second blade thickness dimension is substantially equal to a stressed third predetermined width dimension of the apertures; and,
    each blade further including generally parallel first and second cutting surfaces, said first cutting surface being spaced axially outward from said blade support first surface and adapted for engaging an outer end portion of a generally tubular workpiece, and said second cutting surface being spaced outwardly from said blade support second surface and adapted for engaging an inner end portion of a generally tubular workpiece.

7. The deburring tool as defined in claim 6 wherein said cylindrical housing has means for gripping along an exterior surface thereof.

8. The deburring tool as defined in claim 6 wherein said cylindrical housing and conical blade support are cast from a zinc material.

9. The deburring tool as defined in claim 6 wherein said blade cutting surfaces are bevelled for positive cutting action.

10. The deburring tool as defined in claim 6 wherein said blades are fastened together.

11. A deburring tool for reaming inner and outer diameter surfaces of an associated workpiece comprising:

a generally cylindrical housing having first and second open ends spaced along a longitudinal axis;

a generally conical support member extending radially inward from a housing interior surface, said support member having a base portion disposed adjacent said first end and an apex adjacent said second end at said longitudinal axis;

said conical support member having plural, equal-sized, wedge-shaped members, said wedge-shaped members being spaced by apertures, each aperture having a first predetermined dimension;

a blade assembly including, a plurality of substantially identical blades integrally joined together, each blade having a predetermined thickness dimension and parallel first and second angularly disposed cutting surfaces;

said first cutting surface of each blade spaced outwardly from said conical support member in generally facing relation with said first end and adapted for reaming an associated workpiece;

said second cutting surface of each blade spaced outwardly from an opposed surface of said conical support member in generally facing relation with said second end and adapted for reaming an inner diameter surface of an associated workpiece; and, said predetermined thickness dimension of each blade being substantially greater than said aperture first dimension and each blade being press fit into tight engaging relationship with said cylindrical housing.

12. The deburring tool as defined in claim 11 further comprising circumferentially spaced raised areas extending radially outwardly from a housing exterior surface facilitating grasping the deburring tool.

13. The deburring tool as defined in claim 11 wherein said blades are four in number.

14. The deburring tool as defined in claim 11 wherein said blades are fastened together.

* * * * *